United States Patent
Nielsen

(10) Patent No.: US 7,258,237 B2
(45) Date of Patent: Aug. 21, 2007

(54) GRADER APPARATUS

(75) Inventor: Ulrich Carlin Nielsen, Ry (DK)

(73) Assignee: Scanvaegt International A/S, Aarhus N (DK)

( * ) Notice: Subject to any disclaimer, the term of this patent is extended or adjusted under 35 U.S.C. 154(b) by 0 days.

(21) Appl. No.: 11/033,743

(22) Filed: Jan. 13, 2005

(65) Prior Publication Data

US 2005/0189274 A1 Sep. 1, 2005

Related U.S. Application Data

(62) Division of application No. 10/070,831, filed as application No. PCT/DK00/00501 on Sep. 11, 2000, now abandoned.

(30) Foreign Application Priority Data

Sep. 10, 1999 (DK) ............... 1999 01281

(51) Int. Cl.
*B07C 5/16* (2006.01)
*G01G 13/00* (2006.01)

(52) U.S. Cl. ............. 209/645; 414/744.6; 414/744.9; 177/145

(58) Field of Classification Search ............ 209/645, 209/936, 939; 414/21, 744.6, 744.8; 177/145, 177/148, 25.18, 25.19
See application file for complete search history.

(56) References Cited

U.S. PATENT DOCUMENTS

| 4,239,434 A | 12/1980 | Gannon |
| 4,641,271 A | 2/1987 | Konishi et al. |
| 4,692,876 A | 9/1987 | Tenma et al. |
| 4,850,382 A * | 7/1989 | Williams ............ 134/167 R |
| 5,348,440 A | 9/1994 | Focke |
| 5,501,571 A | 3/1996 | Van Durrett et al. |
| 5,908,283 A | 6/1999 | Huang et al. |

FOREIGN PATENT DOCUMENTS

| EP | 0 706 838 A | 4/1996 |
| GB | 2 167 211 A | 5/1986 |
| JP | 09175509 A | 7/1997 |
| WO | WO95 35238 A | 12/1995 |
| WO | WO98 19799 A | 5/1998 |

OTHER PUBLICATIONS

K. Khodabandehloo, "Benefits of Expert Robots: Intelligence vs. Skill" Expert Systems and Robots, Springer-Verlag, Berlin Heidelberg, 1991, pp. 673-697.
K. Khodabandehloo, "Robitic Packaging of Poultry Products" Robotics in Meat, Fish and Poultry Processing, Routledge, 1992, pp. 70-97.
Patent Abstracts of Japan, vol. 18, No. 243 (M-1602), May 10, 1994, & JP 60 31667 A (Hitachi Ltd), Feb. 8, 1985.

* cited by examiner

*Primary Examiner*—Joseph C. Rodriguez
(74) *Attorney, Agent, or Firm*—David S. Safran

(57) ABSTRACT

A method for weighing and portioning items utilizing a robot device. The robot device includes a grip, e.g., a suction cup, to remove an item from a delivery station to a receiving area for placement into a particular batch. The method involves placing the items at delivery station according their weight and the weight of items already moved to a receiving area, selecting the items for a batch from the combination of items available for movement to the batch, and selective batching of the items in weight-determined and, optionally, type-determined groups.

14 Claims, 2 Drawing Sheets

GRADER APPARATUS

CROSS REFERENCE TO RELATED APPLICATION

This application is a divisional of commonly owned, U.S. patent application Ser. No. 10/070,831, filed Jul. 8, 2002 now abandoned.

BACKGROUND OF THE INVENTION

1. Field of the Invention

The present invention concerns a weighing and portioning technique based on the so-called grader technique, where a number of items which are to be portioned out, namely natural foodstuff items with varying weight, are subjected to a weighing-in and are thereafter selectively fed together in a computer-controlled manner to receiving stations for the building-up of weight-determined portions in these stations. In accordance with the known practice, this is effected by a weighing-in on dynamic scales and a subsequent transport along a sorting-out track with control means which can be activated in a selective manner for the delivery of the items to the respective receiver stations along this track.

With the invention it has been realised that use can be made, with very attractive consequences, of a radically changed technique for carrying out both the relevant task and various related operations, namely by not only effecting the delivery, but preferably also the weighing-in while making use of the gradually highly- and commercially-developed robot technique.

2. Description of Related Art

Especially with the use of vision equipment, it is an easy task for a robot arm to grip a conveyed item in a delivery area, e.g. with a suction cup, and feed the item to any receiving station within the operational range of the robot arm. This can be effected immediately if the item has already been weighed and its position determined with regard to the receiving station, and thus these stations do not have to be physically disposed in any certain pattern such as along a conveyor belt, regardless of whether a certain row disposition can be practical out of regard for the guiding-out and feeding away of the formed portions.

However, it is an important aspect of the invention that the robot arm in itself can be arranged not only to grip the items, but also to determine the weight of a supplied item already during an initial lifting of the item from its under layer. This can be effected in a direct manner by mounting the gripping tool on the robot arm in connection with a weighing cell and preferably also an accelerometer, so that a weighing can be effected during an uneven movement, preferably by an initial vertical lifting, so that the weight determination and allocation of the item can be carried out when the item is lifted to a height from which there is initiated a bringing-out of the item in a direction towards the selected receiving station, including a swinging-out for the execution of a movement along one or more e.g. circular rows of receiving stations. The weight determination can also be effected in a less direct manner, e.g. by use of a vision system which, in connection with the lifting of the item, is now also given access for a detection of the underside of the item, whereby the weight can be determined with an accuracy which can be sufficient in many connections. An indirect weight determination can also be effected by the robot arm being influenced with a carefully controlled lifting moment, which will be opposed by the inertia of the item, whereby with a moment analysis of the lifting sequence an expression for the item weight can be calculated.

With the use of vision equipment for place determination of arriving items in connection with the robot-based weight determination of the gripped items, there arises a distinct changing of the conditions which have hitherto been valid for the function of the grading machines. This function has hitherto been conditional on the arriving items being fed individually to the dynamic weighing station, and thereafter conveyed individually, i.e. with suitable distance between them, along the sorting-out track, which hereafter will not apply. The vision equipment can monitor a relatively long and broad supply area at which the items can arrive both at the side of each other and without any critical separation, neither in breadth nor lengthways direction, in that the robot arm can nevertheless drop down with great precision on any selected item. It will be a further possibility that the vision equipment can monitor up to several candidate items in seeking for an item of a certain precise weight, e.g. for the conclusion of a building-up of a portion to a fixed weight. If the vision equipment in itself is not able to effect a weight determination with the necessary accuracy, it will still, however, be able to weigh the items in a "weight-class-determined" manner, and thus hereby disclose e.g. 2-4 items which, with good probability, can be so close to the sought-after weight that one of the items will in any case be able to be used for the purpose. There can thus be effected a more accurate weight determination by the operative robot carrying out a control-weighing of these selected items, and hereby either select the best candidate or omit to use any of them.

To this can be added that by use of the vision equipment, there can also be effected a type determination of items which are supplied in mixed type formation, e.g. in the form of different pieces of parted chickens. In certain productions this will be a quite important criterion for the allocation of the items.

It must be emphasised, however, that it will not be any precondition that use be made of vision equipment, in that it has been found possible to let a robot gripping element fetch items from an area with closely-grouped items. The gripping element can possibly be arranged with a sensor for registration of a failure to grip any item, after which it can be immediately moved slightly for a new attempt.

In the handling of items such as whole fish or chicken legs ("drumsticks"), which are desired to be received at each of the receiving stations in oppositely-directed orientations so that they can be placed together in close formation, or that they can be built up in a receiving box in portions in several layers for achieving a more-or-less horizontal upper layer in the box filling, the control unit will easily be able to be instructed whether the robot arm's gripping tool is to be influenced, if necessary, to turn the gripped item through such an angle that will be suitable for ensuring that the item, upon delivery to the receiving station, will have an orientation which accommodates the relevant requirement on the basis of the information which already exists in the control computer.

Furthermore, with the invention it will be a possibility that "the system", i.e. the controlling of the robot arm, is programmed so that from time to time, and e.g. especially after each working day, the robot arm's gripping tool is controlled for gripping a cleaning nozzle or hose, by means of which the apparatus can thereafter clean itself and all the receiving stations. Finally, the gripping tool itself can be cleaned by co-operation with a stationary cleaning nozzle.

There is hitherto considered a weight-determined portioning-out, but the technique will have further possibilities such as a pure sorting-out of items in accordance with more or less any criterion, which shall not necessarily involve a weight criterion, e.g. in accordance with type, colour, shape, degree of possible deformation etc.

The technique can also be used for the distribution of items out to a group of receiving stations, in which the received items are weighed separately with the view to feeding them together in weight-determined portions on the basis of the so-called combination-weight principle.

In the laying-out of items on a packing element, such as slices of salmon on a cardboard plate, or the laying-out of items in assortment boxes, it will be a possibility that there has been laid an item which proves to be able to be replaced by a more suitable item, and here there will be the special possibility both that the items can be placed in special patterns, e.g. by scale layout or at the side of one another, and that the robot can be directed by the control unit to remove the "wrong" item from the under layer in favour of the laying-out of an even better item.

It is mentioned that in the supply area to the robot there can appear a relatively large number of items which can be gripped selectively, possibly even by more than a single robot. It can hereby arise that a deficit of items of one or more different qualities can be registered, e.g. in type or size, which are awaited for the furthering of a quick portioning-out. In this connection, it is a possibility that work can be effected with a supply area coupled up front, possibly even of increased size, where one or more robots work in a corresponding manner for the selective transfer of relevant items to the operative supply area.

If the operative robot arm grips an item which after weight determination is not suitable for placing in any of the receiving stations, it can deliver the item either to a re-circulation station or merely back to the supply area, or to a special parking area for items already weight determined, which are thus ready for selective collection at the first given opportunity during the further sequence.

Such a "parking area" can also be used operatively by one or more of the robots being used to receive and to carry out the weight determination of the supplied items, and thereafter deliver the items in a parking area during registration of the respective positions and weights. Hereafter, the only task to be carried out by the operation robot will to distribute the items out to the receiving stations, i.e. it can be without weighing means and without vision equipment, and it can work at increased speed in that the weighing function is omitted. In the parking area, the items can be placed closely at the sides of one another, i.e. operations can be effected with a quite large number of candidates for portioning-out.

When work is to be carried out with the desirable, relatively fast operation frequencies, it can be quite difficult to arrange weighing equipment in connection with a robot arm. It has already been mentioned that the weighing can well be effected by an intermediate delivery of the items to a static weighing device, but this will inevitably result in an increase in the cycle time, since at each weighing there will arise both an in-swinging period and a weighing period, and since none of these can be integrated with an operative movement of items, both of these periods, regardless of whether they can be of short duration, will have a delaying effect on a quick handling of the items. In light of this, it is a special feature of the invention that it can work with "negative weighing", namely in that newly arrived items can be fed successively to a static weighing device or buffer scales which register the weight of that or those items which are placed on the scales, in that the weight determination of an item, which is then gripped and removed by the robot arm can hereby be registered by the associated reduction in the weight on the scales. The said swinging-in and weighing sequences can hereby be concluded already before the relevant item is gripped and removed, and even though a renewed swinging-in and weighing period must subsequently be accepted for determination of the weight of the removed item, this can thus be effected during the actual initial movement of the gripped item, and consequently integrated anyway with this movement without delaying the movement.

In the foregoing it is intimated that the "robot arm" moves in a pivoting movement, regardless of whether the robot otherwise or also moves in diverse horizontal directions, and here it must merely be emphasised that the invention will not be limited in a corresponding manner, the reason being that the robot arm, with its related gripping element, can be displaced just as well as a fixed arm on a robot structure, which as an integrated whole moves in a controlled, co-ordinate-related manner in a length/breadth-controlled operating system.

In the following, the invention will be described in more detail precisely on the basis of such a co-ordinate-related system, without this excluding a pivoting system, and moreover with reference to the drawing, in which

DETAILED DESCRIPTION OF THE INVENTION

Figure 1:
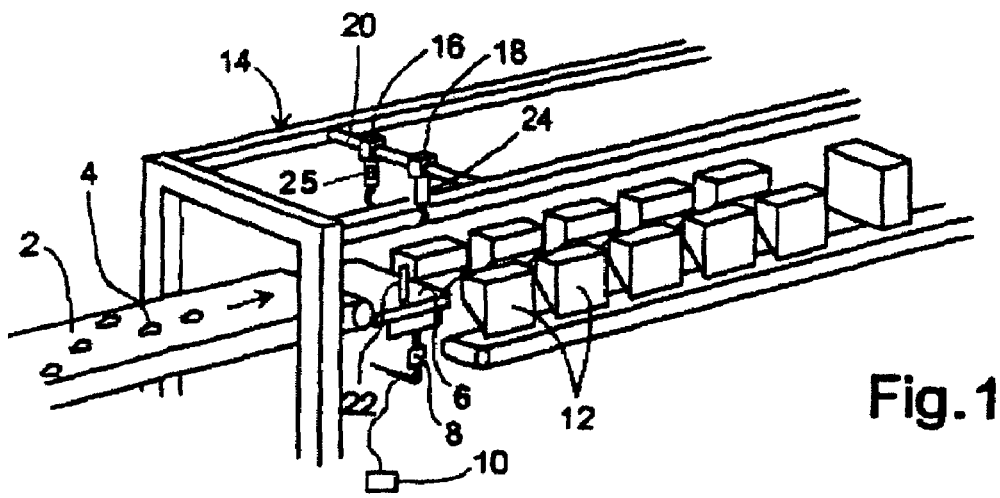
FIG. 1 is a schematic perspective view of a sorting-out or portioning apparatus according to the invention.

In FIG. 1 there is shown a supply conveyor 2 which conveys relevant items 4 to a weighing plate 6 belonging to a weighing station, which is represented by an underlying weighing cell 8, and which is connected to a registration and control computer 10. The conveyor belt 2 continues thereafter to a double row of receiving containers or receiving stations 12, which are shown arranged in direct extension of the conveyor 2, but which could just as well assume any other direction, e.g. at right-angles to the conveyor.

Over the weighing plate there is arranged a co-ordinate-controlled guiding system 14 for an item gripping unit 16 consisting of a base part 18, which by suitable driving means is transversely displaceable in the manner of a carriage on a lengthways displaceable crossbar 20 in the structure 14, and which also has a downwards-extending arm 22 with a lower gripping element 24 which can be moved up and down and be activated for the gripping/releasing of items 4.

The gripping element 24 could equally well be placed on a pivot arm in a diametrically-directed guide system, whereby the row of receiving stations 12 could naturally extend with a distinct curve.

When an item 4 has been delivered to the weighing plate 6, it can quickly afterwards be gripped by the gripping element 24 arid thereafter carried forward for depositing in any of the receiving stations 12, based on the allocation decisions which in accordance with conventional grader technique are made by the control computer 10.

Some of the feeding problems which arise with the known grader technique will hereby already have been overcome, namely especially with regard to adhering items or items which roll easily, which can be difficult to distribute when this shall take place by sideways guiding-out from a feeding conveyor. The weighing plate 6 or a preceding section of the feeding conveyor 2 can possibly be provided with forwardly-tapering, upright V-shaped rib structure 22 which will determine a well-defined delivery position for the items 4, so that the items can be gripped and carried forward by the gripping element 24 with good security. Upon delivery of the items to the receiving stations 12, there will not arise any substantial degree of insecurity, in that all that is involved here is a more-or-less precise releasing of the gripped items 4 from the overlying gripping element 24.

In connection with the invention, however, it will be an advantageous possibility that use can be made of a detector system such as a vision camera; which can detect any non-central positioning of items 4 on the conveyor belt 2, and thus also determine whether relevant items shall be gripped in more-or-less sideways-displaced positions by the gripping element.

A further possibility will be that of using the weighing plate 6 as a kind of buffer, which in any case can well receive items in quick succession or even at the same time, in that an effective weighing can then be carried out as a "negative weighing" by registration of the reduction in weight which arises with a gripping and lifting of a given item.

To this can be added the mentioned possibility of replacing or supplementing the fixed weighing device with a weighing arrangement 25 integrated with the robot's gripping system as shown in FIG. 1, or by a weight-determination carried out on the basis of visual registration of the items, or by any other method for determining the weight of the items.

Figure 2:
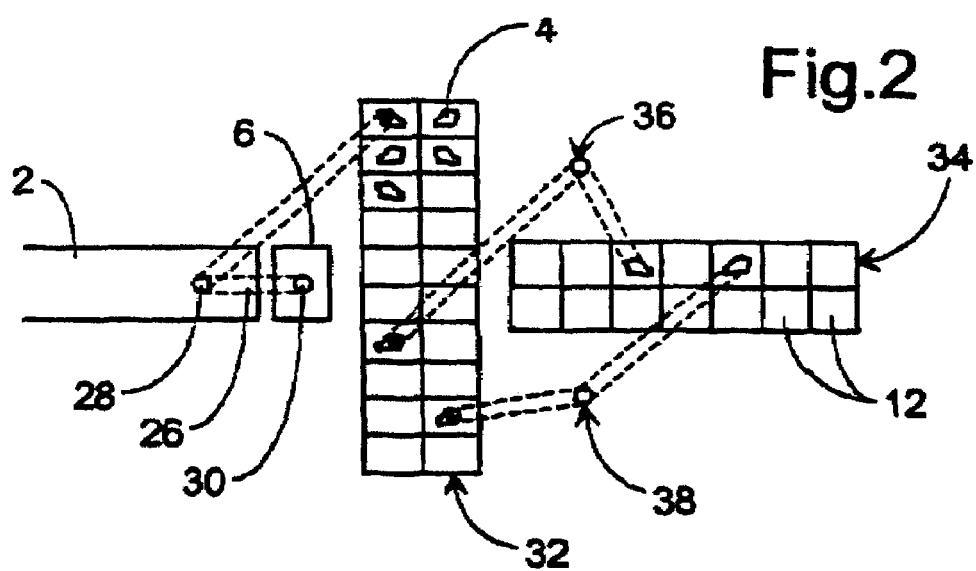
FIG. 2 is a schematic plan view of a modified plant according to the invention.

FIG. 2 shows a modified system, where a single diametrically-directed robot arm 26 is pivotal around a vertical journal 28 placed over the discharge end of the feeding conveyor 2. The arm 26 can be displaced longitudinally in a foldable or telescopically displaceable manner, so that an outer gripping element 30 on the arm can be moved between many different positions. After the weighing plate 6 there is arranged a distribution area 32 which can be supplied with items 4 in different positions from the gripping element 30, so that the control computer 10 will contain information concerning the positioning and weight of the individual items. After the area 32 there follows an area 34 which houses a number of receiving stations 12, and in association with the areas 32 and 34 there are placed a pair of robots 36, 38 which can be of the same type as the robot 28, 26, i.e. with robot arms which can selectively transfer items 4 from the distribution area 32 to the receiving area 34, e.g. for the building-up of weight-determined portions in the stations 12 in accordance with the accumulation principle. In that work can be effected with a great many item positions in the area 32, it can also be relevant to use the combination-weight method, i.e. where the computer determines which of the individual items from the area 32 can be brought together in one and the same station 12 for fulfilling predetermined conditions concerning total weight and possibly the number of items.

In FIG. 2 there are shown three robots, but this is naturally only an example for the increase of the working capacity in relation to the possible use of only one single robot. Precisely with the use of robots, the areas 32 and 34 will otherwise be able to be laid out with random or specially optimised basic form and positioning.

Figure 3:
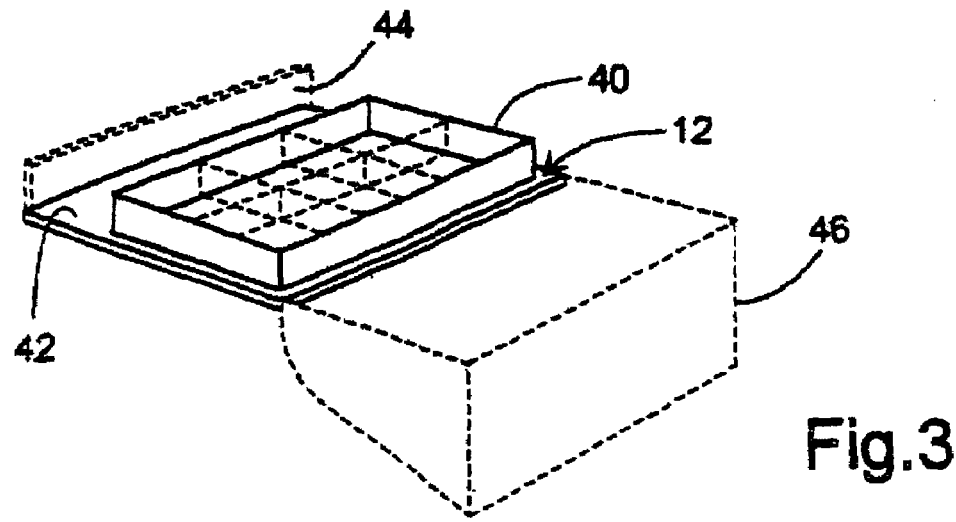
FIG. 3 is a perspective view of a receiving station therein.

FIG. 3 illustrates a special possibility which arises precisely with the use of robots. In a receiving station 12 there is placed a carton packing 40 for the receipt of items in six different sections of the carton, which are shown with stippled lines. The robot can be controlled with good precision for placing the items 4, which have already been allocated to the carton, down in these different sections without the carton itself having to be moved. This will be a result of already-known robot technology, but it is a special characteristic of the invention that it will also be possible for the control computer to "regret" a given allocation if it is subsequently ascertained that an item delivered to a receiving station is more suitable for use in another receiving station, or a better use of a newly-weighed item in the same station. The robot can thus be instructed to collect a selected item from the items already placed in the carton packing 40 for transferring the gripped item back from the carton, with the view either of transferring the item directly to another receiving station 12 or to a distribution area 32 for available, already weight-determined items.

The same principle can also be used where carton packing 40 does not appear in the receiving stations, but simply a depositing plate 42 which is virtually divided into different receiving sections. The robot equipment can deliver items 4 to any of these sections, but can thus also replace items therein, and after an ideal portion weight has been achieved, all of the items in the relevant station 12 can then be delivered collectively, e.g. by a scraper element 44 shown with stippled lines being made to sweep the plate 42 for the shoving of all of the items to a delivery chute 46.

Figure 4:
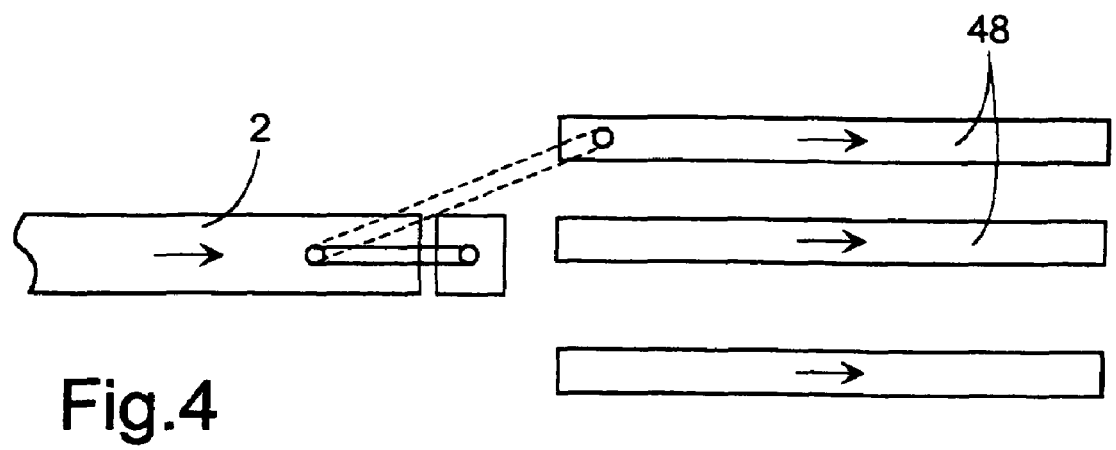
FIG. 4 is a plan view of a second modified plant.

FIG. 4 illustrates the possibility that after weight and type determination, e.g. by use of vision equipment, the items 4 fed on the conveyor 2 can be directed out to different conveyor tracks 48 for further sorting-out in accordance with suitable criteria, completely without the use of special, direct guiding means between the delivery station 6 and the feeding tracks 48, regardless of how these guiding tracks are used in other respects.

In this connection, an apparatus according to the invention will be suitable for carrying out a pure sorting function based or weight or type determination of the supplied items.

Figure 5:
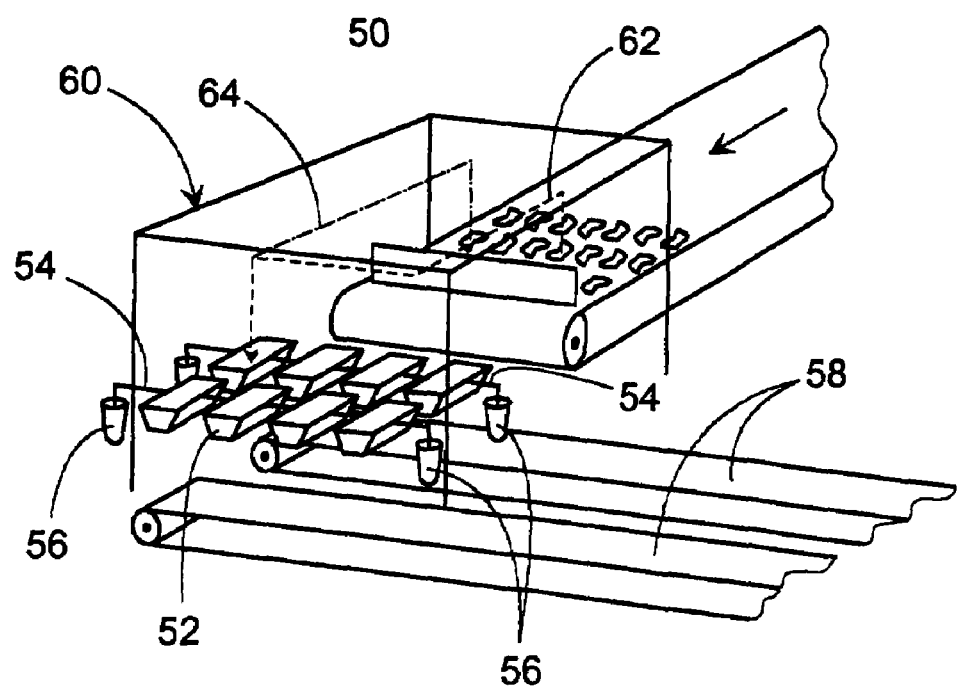
FIG. 5 is a schematic perspective view of a third modified plant.

In FIG. 5 it is shown that a conveyor 2 can deliver items to a stop station 50 where the items can simply be crammed together. Opposite this station there is a receiving area in which two rows of receiving dishes 52 are provided, each row being arranged on a frame 54 supported on respective weighing cells 56. The dishes have bottoms which can be opened, e.g. configured as disclosed in WO 98/12664, and under the rows of dishes there is arranged a conveyor 58 leading away from the station.

Over the overall area there is provided a robot frame 60 with a not-shown "XYZ"-robot. It has been found realistic to let the robot dip down in a number of different positions in the stop station 50 for the collection of items, whereby the gripping percentage will be particularly high in that the items are and remain lying closely together. The robot can thus transfer successively gripped items to any of the dishes 52, and for each item transferred the associated weight determination can thus be effected via the weighing cells 56. In order to minimise the cycle time, the apparatus can be controlled in such a manner- that after each transfer, e.g. as indicated by a stippled line 62, the gripping element will thereafter be guided back without sideways movement as marked with a stippled line 64.

This plant will be suitable for weighing-out following the combination-weight principle, in that the control unit will constantly seek a number of item positions with items which together form a usable portion weight, in that at the same time the relevant dish can be opened and the portioned items deposited on the conveyors 58, or possibly only on a single conveyor. The robot thus merely has the task of constantly effecting new transfers of items to the empty and re-closed dishes. This will not be effected with any fixed transfer pattern, and precisely for this reason the said direct return movement along the line 64 will have the result that items are taken up from the whole breadth of the stop station 50.

When use is made of several robots, it must merely be ensured for each row of dishes that items are transferred successively only to a single dish per row, since otherwise a well-defined weight/position registration can not be effected. If it is desired to avoid such a limitation, each of the dishes must be equipped with weighing means.

In must be noted that the robot function disclosed shall be understood in quite a broad sense, namely fundamentally as a lifting-over function with a certain possibility of selectivity at least at the one of the areas which serve as donor and recipient respectively. With the embodiment according to FIG. 5, work could thus be carried out with a fixed delivery position, namely if the dishes 52 are arranged in a controlled, horizontall-displaceable manner for the successive transfer of items to the empty dishes or corresponding receiving elements.

What is claimed is:

1. A method for separating-out of supplied natural foodstuff items for the batching of these items in weight-determined groups, said batching method comprising the steps of:
   a) determining the weight of each item of an incoming supply of natural foodstuff items;
   b) supplying said natural foodstuff items in a spaced distribution;
   c) using a control unit to keep track of the weight and location of each of the spaced foodstuff items and
   d) using at least two robots, each of which is under the control of said control unit and each of which has a gripping element for the selective gripping of a foodstuff item, to selectively grip and transfer each foodstuff item from the supply of spaced foodstuff items to a receiving location in accordance with the weight of the foodstuff items and the weight of the foodstuff items already transferred, or a combination of the foodstuff items available for transfer, so as to produce batches of foodstuff items of a predetermined weight or predetermined weight and type.

2. The method according to claim 1, further comprising the step of performing an item type determination, and the production of batches includes selective positioning of arriving items into type-determined groups.

3. The method according to claim 1, wherein said weight determining is performed by a "negative weighting" in which the items are supplied to a static weighing device at a supply station and the item weight is determined as a function of a weight reduction which takes place by the removal of the individual item from the supply station.

4. The method according to claim 1, comprising the further step of employing vision equipment to perform at least one of a type-determination, weighing and position-determination of the items.

5. The method according to claim 1, comprising the further step of using at least one of the robots to perform a periodic cleaning procedure in an area of operation of the robot by gripping of a supply hose for water or other cleaning agent and spraying the water or other cleaning agent on relevant areas of operation.

6. The method according to claim 1, wherein said weighing is performed by a weighing arrangement integrated with the gripping element.

7. The method according to claim 1, wherein a first of said robots transfers each item to a first receiving location in which the items are segregated in accordance with at least the weight of the item, and wherein a second of said robots transfers said items from said first receiving location to a second receiving location in which items are formed into said batches.

8. The method according to claim 1, wherein each of said robots directly transfers each item from the incoming supply of items directly to a respective receiving location in which selected ones of said items are formed into said batches.

9. The method according to claim 1, comprising the step of adjusting batch content by robotically retrieving an item transferred to one of the batches being formed to another of the batches being formed upon determination by the control unit that the item to be retrieved is better suited to formation of the other batch.

10. An Apparatus for separating-out of supplied natural foodstuff items for the batching of these items in weight-determined groups, said batching apparatus comprising:
   a) weight determining means for determining the weight of each item of an incoming supply of items;
   b) means for supplying said foodstuff items in a spaced distribution;
   c) a control unit for keeping track of the weight and location of each of the spaced foodstuff items; and
   d) at least two robots, each of which is under the control of said control unit and each of which has a gripping element for the selective gripping of an individual foodstuff item, for selectively gripping and transferring each foodstuff item from the supply of spaced foodstuff items to a receiving location in accordance with the weight of the foodstuff items and the weight of foodstuff items already transferred, or a combination of the foodstuff items available for transfer, so as to produce batches of foodstuff items of a predetermined weight or predetermined weight and type;
   wherein the weight determining means comprises a static weighing device at a supply station for the items for accumulated weighing-in of items and for enabling the determination of the weight of each item removed from the supply station by the gripping element of one of the robots by a reduction of the weight of items at the supply station due to the removal of the item.

11. The apparatus according to claim 10, wherein said apparatus further comprises means for performing a type-determination of the incoming items and wherein said control unit is operative for effecting a selective batching of the items in both weight-determined and type-determined groups.

12. An Apparatus for separating-out of supplied natural foodstuff items for the batching of these items in weight-determined groups, said batching apparatus comprising:
   a) weight determining means for determining the weight of each item of an incoming supply of items;
   b) means for supplying said foodstuff items in a spaced distribution;
   c) a control unit for keeping track of the weight and location of each of the spaced foodstuff items and
   d) at least two robots, each of which is under the control of said control unit and each of which has a gripping element for the selective gripping of an individual foodstuff item, for selectively gripping and transferring each foodstuff item from the supply of spaced foodstuff items to a receiving location in accordance with the weight of the foodstuff items and the weight of foodstuff items already transferred, or a combination of the foodstuff items available for transfer, so as to produce batches of foodstuff items of a predetermined weight or predetermined weight and type; wherein a first of said robots is adapted to selectively transfer each item to a first receiving location in which the items are segregated in accordance with at least the weight of the item, and wherein a second of said robots is adapted to selectively transfer said items from said first receiving location to a second receiving location in which items are formed into said batches.

13. The apparatus according to claim 10, wherein each of said robots is adapted to directly transfer each item from the incoming supply of items directly to a respective receiving location in which selected ones of said items are formed into said batches.

14. The apparatus according to claim 10, wherein said control unit is adapted to adjust batch content by causing a robotic to retrieve a item transferred to one of the batches being formed to another of the batches being formed upon determination by the control unit that the item to be retrieved is better suited to formation of the other batch.

* * * * *